United States Patent [19]

Katbi et al.

[11] Patent Number: 5,449,255
[45] Date of Patent: Sep. 12, 1995

[54] CUTTING INSERT HAVING MULTIPLE CHIP BREAKER SURFACES

[75] Inventors: Karl Katbi, Troy; Thomas Bernadic, Madison Hts.; John Patterson, Hazel Park; Brendan Brockett, Dearborn Hts.; Tony Lowe, Royal Oak, all of Mich.

[73] Assignee: Valenite Inc., Madison Heights, Mich.

[21] Appl. No.: 209,130

[22] Filed: Mar. 11, 1994

[51] Int. Cl.6 .................... B23P 15/28; B23B 27/22
[52] U.S. Cl. ........................................ 407/114; 407/115
[58] Field of Search ............................... 407/113–116

[56] References Cited

U.S. PATENT DOCUMENTS 4,969,779 11/1990 Barten ............................... 407/114

Primary Examiner—Bruce M. Kisliuk
Assistant Examiner—Eileen P. Morgan
Attorney, Agent, or Firm—John W. Gregg

[57] ABSTRACT

A flat disk-like tool insert has a plurality of arcuate cutter tips for machining the side surface of a rotating work piece, and a plurality of linear cutting edges for machining a chamfer on the end of the work piece. An endless land surface is contiguous with the cutter tips and the linear cutting edges so as to deflect metal chips away from the machined surfaces. Each tool tip is aligned with two chip breaker ledges that are arranged in a step configuration, such that chips of varying thickness can be effectively and cleanly broken without interference with the machining process. A third chip breaker ledge is set back from each linear cutting edge for breaking chips generated during a chamfering operation.

17 Claims, 3 Drawing Sheets

CUTTING INSERT HAVING MULTIPLE CHIP BREAKER SURFACES

BACKGROUND OF THE INVENTION

1. Field of the Invention

This invention relates to cutter bits for machining the side surfaces of rotating work pieces.

2. Prior Developments

During the machining of metal work pieces metal chips of an unacceptable string-like character are continuously generated. In order to prevent such chips from interfering with the machining process it is necessary to break such chips into shorter sections. The necessary chip-cutting action, or chip-breaking action, is accomplished with a chip-breaker ledge located near the cutting tip in the path of the chip generated by the metal cutting operation.

Preferably the chip-breaker ledge is located relatively close to the cutting tip in order to achieve a better shearing force on the chip. If the chip-breaker ledge is located too far away from the cutting tip the portion of the chip between the cutting tip and the breaker ledge will bend so that the chip slides along the ledge rather than breaking off cleanly.

The requirement that the chip-breaker ledge be relatively close to the cutting tip presents a problem when the chip thickness is variable. If the chip-breaker ledge is located close enough to the curing tip to effectively break thin chips it may be too close to effectively handle thick chips; the thicker chip material may run into the breaker ledge while it is still attached to the work piece, such that the chip is crowded into the space between the cutting tip and the breaker ledge.

U.S. Pat. No. 2,903,781 discloses a machining system wherein the chip breaker is formed separately from the cutting insert. The chip-breaker element can be adjusted toward or away from the cutting tip for handling chips of varying thickness. However, the chip-breaker element cannot simultaneously handle chips of varying thickness. A set screw adjustment must be manually operated to accommodate the chip-breaker to different chip thicknesses; i.e. the chip breaker is set relatively close to the cutting tip for breaking relatively thin chips, and relatively far away from the cutting tip for handling relatively thick chips.

SUMMARY OF THE INVENTION

The present invention is concerned with a cutting insert having two chip-breaker ledges set back from the cutting tip by different distances, whereby different thickness chips can be effectively (and cleanly) broken without adjusting or resetting the chip-breaker mechanism. The chip-breaker ledges are preferably integral with the cutter body so as to avoid the necessity for calibrating or precisely locating the chip-breakers relative to the cutting tip.

In preferred practice of the invention the two chip-breaker ledges are arranged in a step-like pattern, so that the chip breaker ledge closest to the cutting tip is in a plane offset only a slight distance from the plane of the cutting tip; the chip-breaker ledge furthest away from the cutting tip is in a plane offset a greater distance from the plane of the cutting tip. With the step-like chip breaker arrangement the chip-breaking action of the chip breaker furthest away from the cutting tip can be effectively accomplished without interference from the other chip breaker.

The double stepped chip-breaker design at the cutting tip allows for greater chip control at the lighter cutting depths and lower feed rates. At the heavier cutting depths the chip materials will have essentially no contact with the thin chip breaker ledge; the thicker chips will be effectively sheared off without being over crowded into the space between the cutting tip and chip-breaker surface.

The insert of this invention comprises a flat disk-like body having two flat parallel major faces adapted to be engaged with a clamping fixture, whereby the cutter body is firmly held in the fixture. The insert preferably has a square plan configuration that forms four arcuate cutting tips at the corners of the square, and four linear cutting edges on the sides of the insert square. The linear cutting edges are used for chamfering the end of a work piece after the side surface of the work piece has been machined by one of the arcuate cutting tips. An endless land surface extends around the periphery of the insert contiguous with the arcuate cutting tips and linear cutting edges. Two chip-breaker ledges are provided for each cutting tip 13. An edge on one of the major faces of the cutter body forms a chip-breaker for each linear cutting edge. The insert has built-in chip-breaker surfaces for all of the cutting tips and linear curing edges. The chip-breaker surfaces are preferably set back from the associated cutting tips or cutting edges by different distances so as to achieve clean chip-breaker action with lighter or heavier feed rates and chip thickness.

THE DRAWINGS

DESCRIPTION OF A PREFERRED EMBODIMENT OF THE INVENTION

Figure 1:
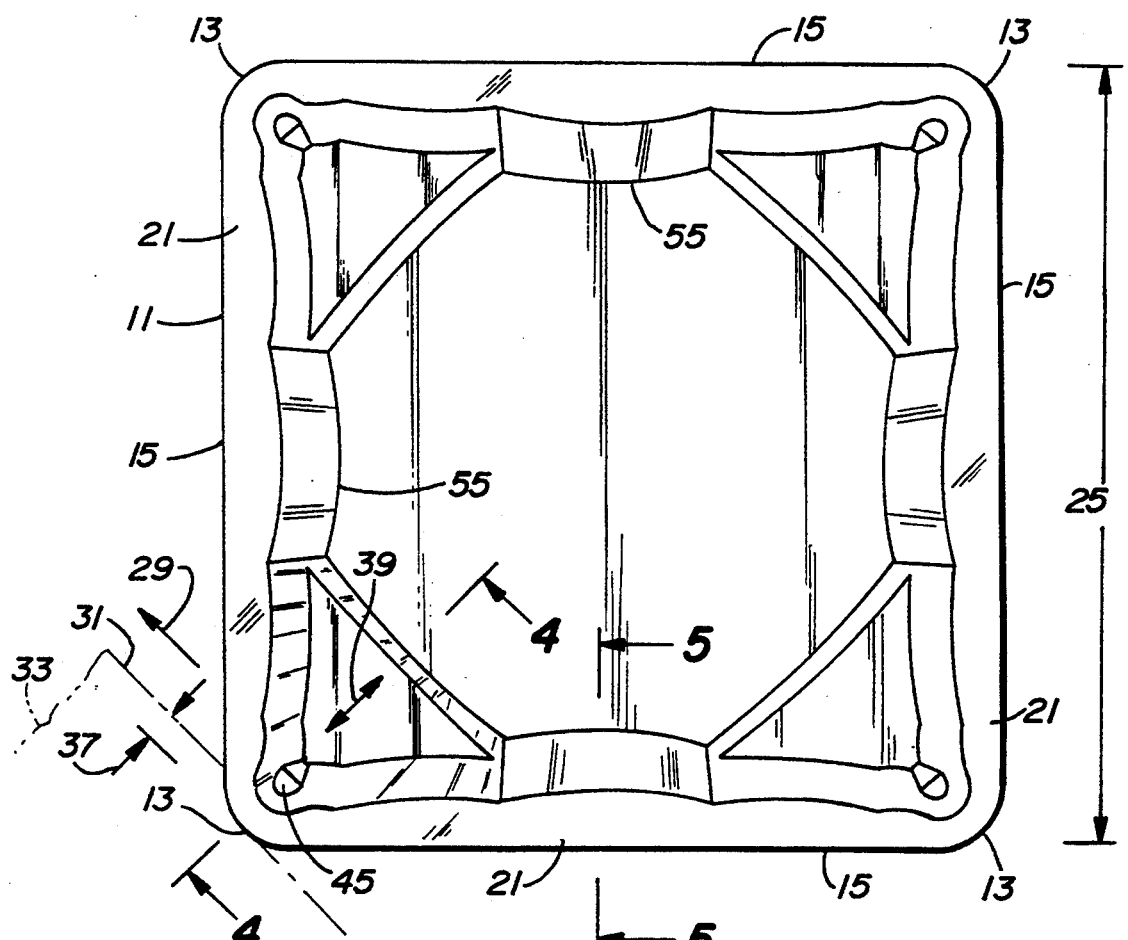
FIG. 1 is a plan view of a cutter body constructed according to the invention.
Figure 2:
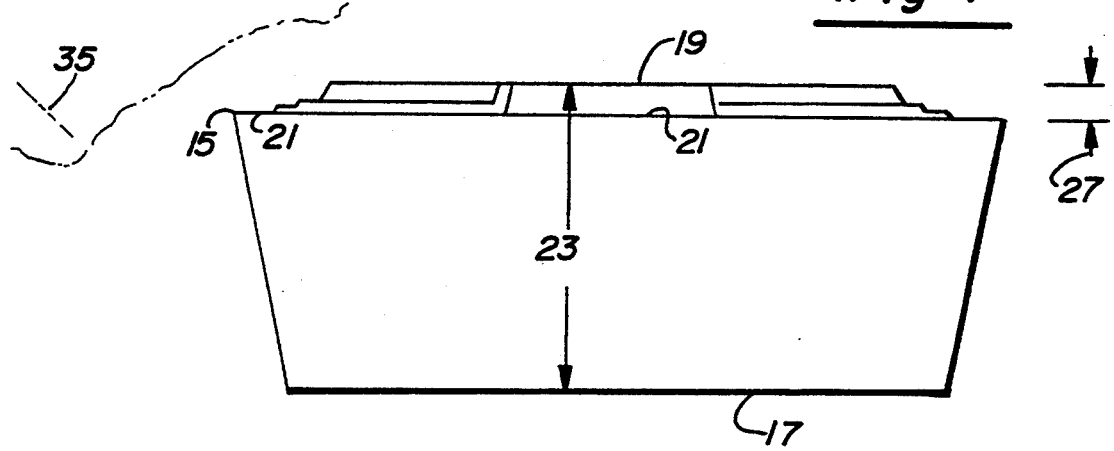
FIG. 2 is an edge view of the cutter body shown in FIG. 1.
Figure 3:
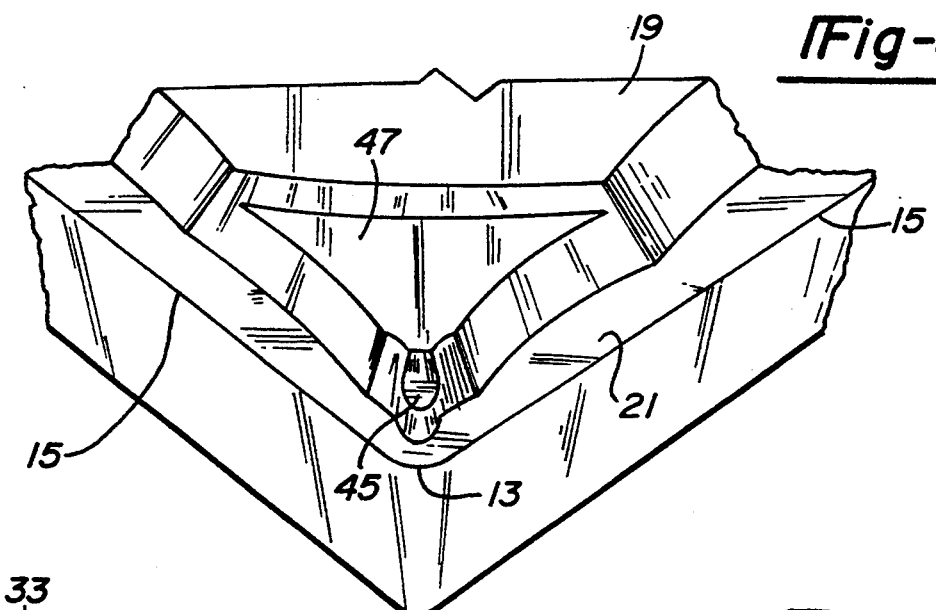
FIG. 3 is a fragmentary perspective view of a corner area of the FIG. 1 cutter

FIG. 1 is a plan view of a cutter body (or tool bit) embodying the invention. As viewed in FIG. 1, the cutter body 11 has a square configuration that forms four corners and four linear edges. Each corner defines a sharpened nose 13 that forms an arcuate cutting tip at the juncture between adjacent ones of the sharpened linear edges 15.

The insert has a flat disk-like character, defined by a flat lower face 17 and a flat upper face 19. The upper portion of the flat disk-like body is inset relative to the lower portion, such that a flat endless land surface 21 extends around the cutter body in a plane that parallels the flat faces 17 and 19.

Insert 11 can have various dimensions. However, the cutter body will typically have a thickness dimension 23 measuring about 0.2 inch, and a side edge length dimension 25 measuring about 0.5 inch. The plane of land surface 21 will be spaced from the plane of flat upper face 19 by a distance 27 measuring about 0.02 inch.

The insert can be clamped in a horizontal position in a fixture so that a selected one of the sharpened cutting tips 13 is engaged with a side surface of a rotating work piece, whereby the cutter body can traverse the work piece to perform a machining operation on the side surface of the work piece. Flat faces 17 and 19 of the cutter body will be clamped within the support fixture so that the cutter body will remain in a horizontal position while it is traversing the work piece.

FIG. 1 shows the insert 11 movable in the direction of arrow 29, such that cutting tip 13 machines the side surface 31 of a work piece 33 rotating on a horizontal axis 35. The depth of cut achieved by the cutting tip is represented by dimension 37. Variations in the depth of cut can be achieved by adjusting the holding fixture toward or away from axis 35, as indicated by arrow 39 in FIG. 1.

Figure 4:
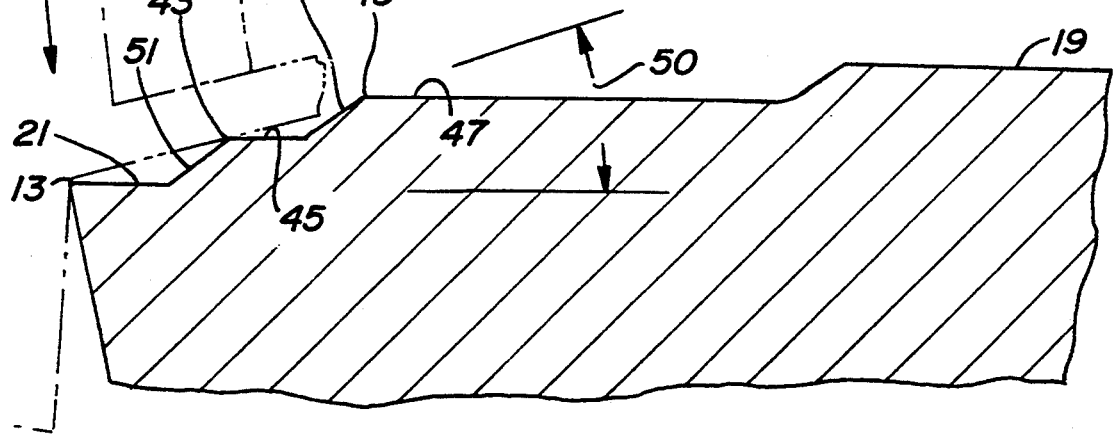
FIG. 4 is an enlarged fragmentary sectional view taken on line 4—4 in FIG. 1.

FIG. 4 shows cutting tip 13 penetrating the rotating work piece 33 to generate a metal chip 41. The chip forcibly engages the edge 43 of an elevated ledge 45, such that edge 43 causes the chip to break off from the work piece at a point between edge 43 and cutting tip 13.

Figure 6:
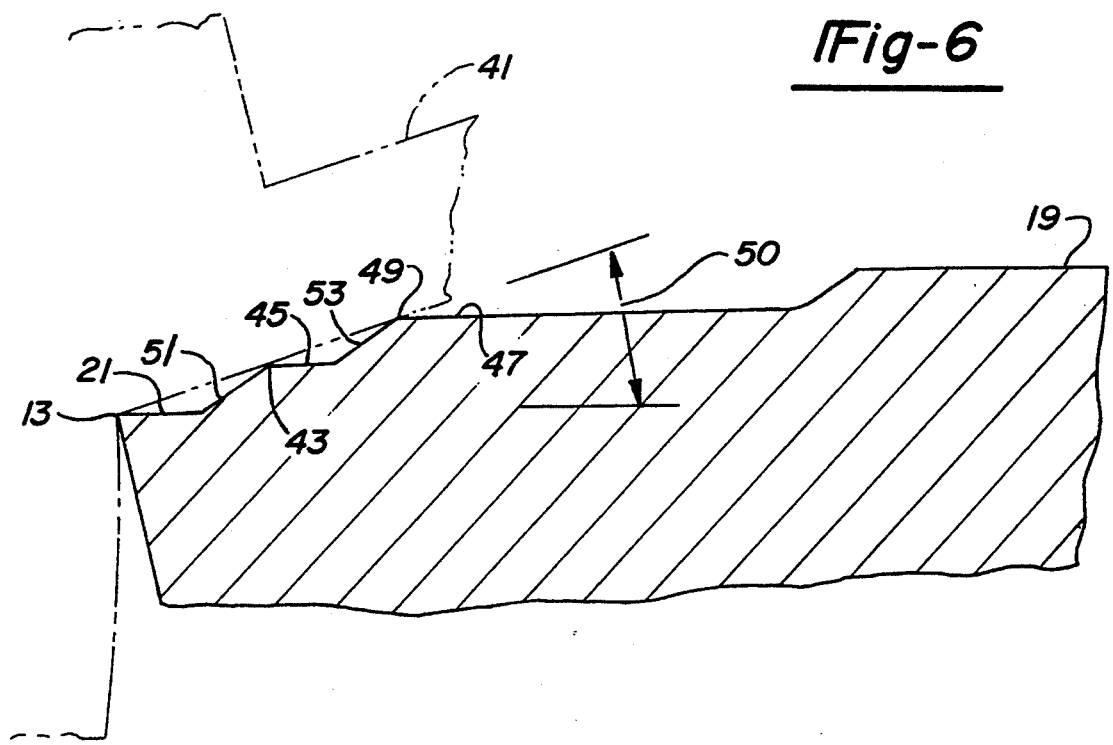
FIG. 6 is a view taken in the same direction as FIG. 4, but illustrating a different chip breaker action that is achievable according to the invention.

The chip-generating process is on-going and continuous. Similarly, the chip-breaking action is cyclical and repetitive. FIG. 4 shows the cutter body set to generate a relatively thin metal chip 41, e.g. a metal chip having a thickness of about 0.008 inch. FIG. 6 shows the cutter body adjusted away from the work piece rotational axis to generate a thicker metal chip, e.g. a chip having a thickness of about 0.025 inch.

The thicker chip depicted in FIG. 6 cannot effectively be severed by chip breaker ledge 45 because edge 43 of that ledge is located in line with the work piece envelope (i.e. to the left of the chip in FIG. 6). A second chip-breaker ledge 47 is spaced to the right of ledge 45 for breaking the thicker chip. Edge 49 of ledge 47 exerts a shearing action on the chip to break the chip away from the work piece.

Ledges 45 and 47 are spaced different distances from the plane of land surface 21, such that ledge 47 is elevated a sufficient distance to contact the thicker chip without interference from ledge 45. Edge 43 on ledge 45 is set back (or below) an imaginary straight line joining cutting tip 13 and edge 49, such that the thicker chip contacts edge 49 rather than edge 43. As seen in FIG. 4, the imaginary straight line joining tip 13 and edge 49 extends at an angle 50 that measures about eighteen degrees. Edge 43 of ledge 45 is spaced slightly below this imaginary straight line.

The set-back spacings between edges 43, 49 and cutting tip 13 can be varied while still practicing the invention. However, typically edge 49 will be spaced from tip 13 by about 0.045 inch, and edge 43 will be spaced from tip 13 by about 0.024 inch. The plane of ledge 47 is spaced from the plane of land surface 21 by about 0.014 inch.

Land surface 21 is joined to edge 43 by an inclined cam surface 51. Similarly, ledge 45 is joined to edge 49 by a cam surface 53. Each cam surface has an inclination angle of about thirty five degrees, which is sufficient for guidance of the leading edge of the metal chip onto the respective chip-breaker ledge. The radius of the arcuate cutting tip 21, as viewed in FIG. 1, is preferably about one eighth inch.

Figure 5:
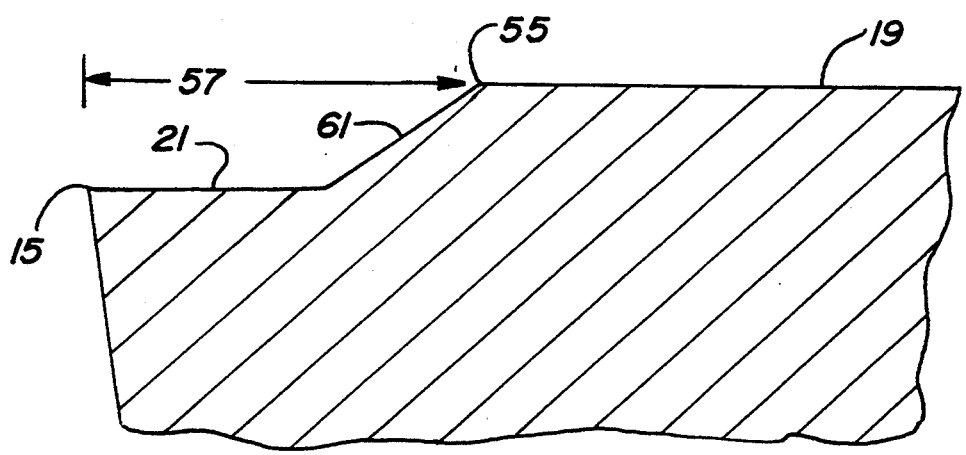
FIG. 5 is an enlarged fragmentary sectional view taken on line 5—5 in FIG. 1.
Figure 7:
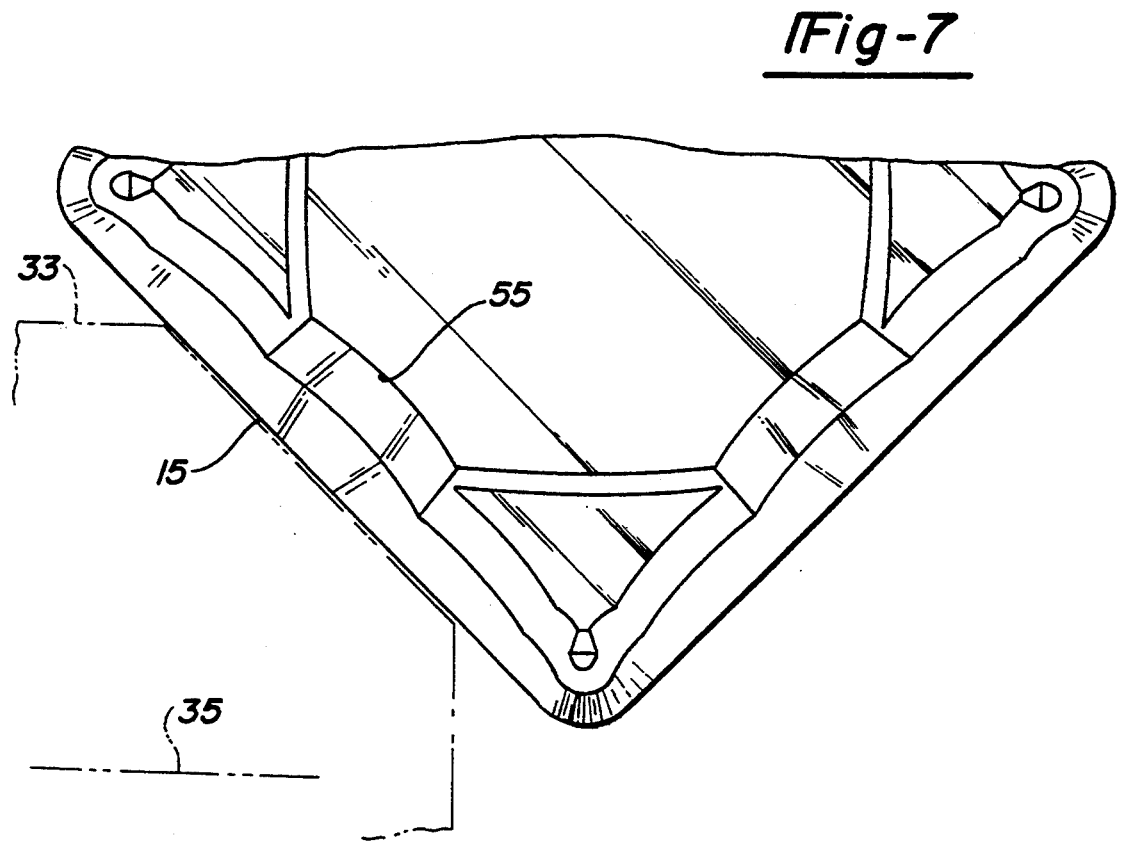
FIG. 7 is a fragmentary view taken in the same direction as FIG. 1, but showing the cutter body oriented for cutting a chamfer on the end surface of rotating work piece.

The insert can be used to form a chamfer on an end surface of the machined work piece. FIG. 7 shows the cutter body oriented so that one of its linear edges 15 is oriented to form a chamfer surface on work piece 33. During the chamfering operation the metal chip generated by linear cutting edge 15 is relatively thick when the tool bit is operated at best efficiency. The relatively thick chip requires that the chip-breaker surface be spaced a relatively long distance from cutting edge 15. The cutter body shown in the drawings includes four chip-breaker edges 55 formed on flat face 19 of the cutter body. Each chip-breaker edge 55 is set back from the associated linear cutting edge 15 by a relatively great distance 57 (FIG. 5).

Set back distance 57 for each chip-breaker edge 55 is greater than the corresponding distance from cutting tip 13 to breaker edge 49 (FIG. 4), such that a given work piece can be machined efficiently on its side surface and on its chamfered end. Land surface 21 is joined to each chip-breaker edge 55 by a cam surface 61 having an inclination angle of about thirty five degrees.

The insert can be formed of various materials, e.g. tungsten carbide or various cermet materials. Specific dimensions and angular relationships have been mentioned in order to explain the desired chip-breaker operations. However, it will be appreciated that the cutter body can be formed in a range of sizes and configurations. Preferably the cutter body has a square plan shape. However, other polygonal shapes can be used.

What is claimed is:

1. A cutter insert for machining a side surface of a rotating work piece, comprising a flat disk-like cutter body having two flat parallel major faces each face in a different plane adapted to receive clamping pressures generated by a holding fixture, and a sharpened nose located between the planes of said flat faces for traversing a work piece to machine the work piece surface; said nose having a cutting tip, a land surface contiguous with said cutting tip for engaging the chip formed by said cutting tip, a first ledge spaced from the land surface a relatively slight distance for breaking relatively thin chips, a first ramp surface ascending from and joining the land surface with the first ledge, a second ledge spaced from the land surface a relatively great distance for breaking relatively thick chips and a second ramp surface ascending from and joining the first ledge with the second ledge; said first ledge being located between said cutting tip and said second ledge in a stepped configuration, whereby the second ledge is enabled to break relatively thick chips without interference from the first ledge.

2. The cutter insert of claim 1, wherein each ledge has an edge adapted to engage chips formed by said cutting tip; the edge on said first ledge being set back slightly from an imaginary straight line extending from said cutting tip through the edge of said second ledge.

3. The cutter insert of claim 2, wherein said imaginary line is angled to the plane of said land surface at an angle of about eighteen degrees.

4. The insert of claim 2, wherein the edge of said second ledge is spaced from said cutting tip by a distance of about 0.045 inch.

5. The insert of claim 1, wherein said first ramp surface is angled to said land surface to an angle of about thirty five degrees.

6. The insert of claim 1, wherein said cutting tip is a convex arcuate edge on said land surface; said arcuate cutting tip having a radius of about one eighth inch.

7. The insert of claim 1, wherein said cutter body has two linear cutting edges extending angularly from said cutting tip for forming a chamfer on the work piece; said land surface being contiguous with said cutting edges for engaging chips formed by said cutting edges during a chamfering operation, and a third ledge spaced from the plane of said land surface for chip breakage action during a chamfering operation; each said third ledge having an edge set back from the cutting edge by a distance greater than the spacing between said cutting tip and said second ledge.

8. The insert of claim 7, and further comprising a cam surface extending from said land surface to each said third ledge.

9. The insert of claim 8, wherein said cam surface is angled to said land surface at an angle of about thirty five degrees.

10. A cutter insert for machining a side surface and an end surface on a rotating work piece, comprising a flat disk-like cutter body having two flat parallel major faces each face in a different plane and a square plan configuration; said cutter body having a sharpened peripheral edge extending there around, and an endless land surface contiguous with said sharpened edge; said sharpened peripheral edge forming four arcuate cutting tips at the corners of the cutter body and four linear cutting edges on the sides of the cutter body; a first ledge spaced from the land surface at each corner of the cutter body for breaking relatively thin chips generated by the cutting tip; a first ramp surface ascending from and joining the land surface with the first ledge; a second ledge spaced from the land surface at each corner of the cutter body for breaking relatively thick chips generated by the cutting tip; a second ramp surface ascending from and joining the first ledge with the second ledge; the spacing between said land surface and each said first ledge being less than the spacing between said land surface and each said second ledge; each said first ledge being located between the cutting tip and the second ledge in a stepped configuration, whereby each said second ledge is enabled to break relatively thick chips without interference from the first ledge.

11. The insert of claim 10, wherein each ledge has an edge adapted to engage chips formed by the associated cutting tip; the edge on each said first ledge being set back slightly from an imaginary straight line extending from the associated cutting tip through the edge of the associated second ledge.

12. The insert of claim 11, wherein each said imaginary line is angled to the plane of said land surface at an angle of about eighteen degrees.

13. The insert body of claim 11, wherein one of the major faces on the cutter body has four side edges set back from said four linear cutting edges; said four side edges being set back from the associated linear cutting edges by a distance that is greater than the spacing between each cutting tip and each associated second ledge, whereby said four side edges act as chip-breakers during chamfering operations.

14. A cutter insert for machining a side surface of a rotating workpiece, comprising a flat disk-like cutter body having two flat parallel major faces, each face in a different plane, adapted to receive clamping pressures generated by a holding fixture, and a sharpened nose located between the planes of said flat surfaces for traversing a work piece to machine the work piece surface; said nose having a cutting tip and two linear cutting edges extending angularly from the cutting tip for forming a chamfer on the work piece; a land surface contiguous with said cutting tip for engaging the chip formed by said cutting tip and contiguous with the cutting edges for engaging chips formed by the cutting edges during a chamfering operation; a first ledge spaced from the land surface a relatively slight distance for breaking relatively thin chips, a second ledge spaced from the land surface a relatively great distance for breaking relatively thick chips, and a third ledge spaced from the land surface for chip breakage action during a chamfering operation, the third ledge having an edge set back from the cutting edge by a distance greater than the spacing between the cutting tip and the second ledge; the first ledge being located between the cutting tip and the second ledge in a stepped configuration, whereby the second ledge is enabled to break relatively thick chips without interference from the first ledge.

15. The insert of claim 14, and further comprising a cam surface extending from said land surface to each said third ledge.

16. The insert of claim 15, wherein said cam surface is angled to said land surface at an angle of about thirty five degrees.

17. A cutter insert for machining a side surface and an end surface on a rotating work piece, comprising a flat disk-like cutter body having two flat parallel major faces, each face in a different plane, and a square plan configuration; said cutter body having a sharpened peripheral edge extending therearound, and an endless land surface contiguous with said sharpened edge; said sharpened peripheral edge forming four arcuate cutting tips at the corners of the cutter body and four linear cutting edges on the sides of the cutter body; a first ledge spaced from the land surface at each corner of the cutter body for breaking relatively thin chips generated by the cutting tip; a second ledge spaced from the land surface at each corner of the cutter body for breaking relatively thick chips generated by the cutting tip; the spacing between said land surface and each said first ledge being less than the spacing between said land surface and each said second ledge; each said first ledge being located between the cutting tip and the second ledge in a stepped configuration, whereby each said second ledge is enable to break relatively thick chips without interference from the associated first ledge; wherein each ledge has an edge adapted to engage chips formed by the associated cutting tip, the edge on each said first ledge being set back slightly from an imaginary straight line extending from the associated cutting tip through the edge of the associated second ledge; and wherein one of the major faces on the cutter body has four side edges set back from said four linear cutting edges, said four side edges being set back from the associated linear cutting edges by a distance that is greater than the spacing between each cutting tip and each associated second ledge, whereby said four side edges act as chip-breakers during chamfering operations.

* * * * *